United States Patent
Cannelli, Jr.

[19]

[11] Patent Number: 6,155,760
[45] Date of Patent: Dec. 5, 2000

[54] WORKPIECE RECEPTACLE FOR PRESSES

[76] Inventor: Victor Cannelli, Jr., 120 Genesee La., Madison, Conn. 06443

[21] Appl. No.: 09/303,452

[22] Filed: May 3, 1999

[51] Int. Cl.[7] .................................................... B23D 41/02
[52] U.S. Cl. ............................ 409/276; 408/67; 409/244
[58] Field of Search ............................... 408/67; 409/244, 409/250, 251, 256, 276; 29/DIG. 102, 251, 76; 269/15, 16

[56] References Cited

U.S. PATENT DOCUMENTS

| | | |
|---|---|---|
| 438,605 | 10/1890 | Cook .......................................... 408/65 |
| 498,186 | 5/1893 | Plopper ...................................... 408/66 |
| 3,806,979 | 4/1974 | Bonami ..................................... 15/21.1 |
| 3,960,056 | 6/1976 | Holstein et al. . |
| 4,180,360 | 12/1979 | Dopp . |
| 4,212,573 | 7/1980 | Fields ....................................... 409/251 |
| 4,266,894 | 5/1981 | Zuzanov . |
| 4,477,216 | 10/1984 | Van De Motter et al. . |
| 4,515,504 | 5/1985 | Moore, Sr. ................................ 408/67 |
| 4,665,785 | 5/1987 | Thurner ...................................... 83/98 |
| 4,901,503 | 2/1990 | Gomez et al. ............................. 53/244 |
| 5,150,996 | 9/1992 | Thoroughman .......................... 409/259 |
| 5,184,985 | 2/1993 | Varinelli et al. . |
| 5,246,320 | 9/1993 | Krippelz, Jr. ............................ 409/244 |
| 5,489,169 | 2/1996 | Scott et al. . |
| 5,509,454 | 4/1996 | Giacometti ............................. 409/137 |
| 5,778,480 | 7/1998 | Nitinger .................................. 15/210.1 |
| 5,833,411 | 11/1998 | Holstein et al. . |

FOREIGN PATENT DOCUMENTS

| | | | |
|---|---|---|---|
| 0434295 | 6/1991 | European Pat. Off. ................. | 408/67 |
| 3324615 | 5/1984 | Germany .................................. | 408/67 |
| 2078935 | 1/1982 | United Kingdom ..................... | 408/67 |

OTHER PUBLICATIONS

Catalog 350C of DAKE Division of JSJ Corporation pp. 14–17.

*Primary Examiner*—Stephen F. Gerrity
*Assistant Examiner*—Adrian M. Wilson
*Attorney, Agent, or Firm*—Robert H. Montgomery

[57] ABSTRACT

A device for use with a press of the type which includes a vertical ram for exerting a force on a first part to press the first part through a second part where the first part falls free when pressed through and separated from the second part comprising, a vertically extending shaft, an arm mounted to the shaft for generally horizontal rotational movement on the arm, a catch receptacle for a first part which is pressed free of a second part, means are provided for mounting the catch receptacle on the arm at varying distances from where the arm is mounted to the shaft whereby the catch receptacle may be positioned under the vertical ram of the press and catch a first part as it is pressed free of the second part. The catch receptacle may be varied in length in accordance with the length of the part being pressed to insure the pressed part will remain in the receptacle The shaft may be mounted to a bracket secured to the base or other part of the press and depend down from the base of the press or the shaft may be free standing on a base resting on the floor.

29 Claims, 4 Drawing Sheets

WORKPIECE RECEPTACLE FOR PRESSES

FIELD OF THE INVENTION

This invention relates to a receptacle for presses to catch and retain an article which is pressed through or from another article.

BACKGROUND OF THE INVENTION

In many applications an article is joined to another by a press fit of a shaft into a device which is mounted to the shaft. Also, it is often necessary to define a key way in an article such as a pulley, sprocket or gear which is to be mounted to and keyed to a shaft. A cutting tool known as a broach is forced through the bore of the pulley cutting a key way into the wall defining the bore. Such broach is forced to cut the key way under very high pressure by an arbor or a hydraulic press.

The broach is an elongated tool of very hard and brittle material having cutting teeth which taper outwardly along its length from bottom to top and with a following shank of smaller dimension such that the broach will fall through a passage cut by the broach. An adapter bushing is received within the bore of the part to be cut and provides a guide for the broach.

As the broach exits the key way which it has cut and the bushing, it either falls to the floor or is held and caught or attempted to be caught by the press operator. The broach has very sharp teeth which may cut the hand of the operator if attempted to be held and be caught by the operator. If permitted to drop to the floor the broach may shatter or be chipped.

During a cutting operation, the broach is lubricated with cutting oil and chips from the piece being cut are generated and fall to the floor as the broach defines the key way. The lubricating oil will drip to the floor and will accumulate with repeated broaching operations. This creates a hazard and further requires clean up time.

Often a, bearing, gear or sprocket on a shaft is frozen to or has a press fit on a shaft and the shaft must be pressed through the part for removal. When the end of the shaft has been pressed into the part thereon, the press operator then positions a short smaller diameter second shaft between the ram of the press and the shaft to permit the shaft to be pressed all the way through the part and free of the part. When the shaft clears the part from which it is pressed it will fall free to the floor and fall over to a horizontal resting position. In so doing it may strike the leg of the operator and cause injury.

Some free standing arbor presses are provided with a mandrel or pressed work piece catcher at floor level which will prevent the pressed work piece from tilting over. However, the work piece still free falls to the floor or the base of the press on the floor and may chip or shatter. Additionally, these mandrel or work piece catchers are integral with the pedestal or base of the press and it is difficult and time consuming to clean chips and lubricating oil from such work piece catchers Accordingly, the present invention provides a new and improved adjustably located receptacle for a first work piece which is pressed through or from a second work piece and normally falls free from the second work piece and strikes the floor. In the case of a cutting operation, as for example a broaching operation, the receptacle also serves to catch chips cut from the object by the broach and dripping lubricating oil. The receptacle is positioned below the bed of the press a sufficient distance to permit a pressed first work piece to clear the second work piece that it is pressed through or pressed from. This location of the receptacle facilitates removal of the pressed work piece from the receptacle. The receptacle is easily rotated from a operative position and removed from its support for removal of chips and cleaning of oil therefrom.

An object of this invention is to provide a new and improved receptacle for a work piece which is pressed from another object.

Another object of this invention is to provide a new and improved receptacle for a work piece pressed from another object which is easily mounted to or positioned with respect to a press and which is easily adjustable in position to catch a falling work piece A further object of this invention is to provide a new and improved receptacle for a falling work piece in which the receiving portion of the receptacle may be varied in depth in accordance with the length of the work piece it will catch.

A further object of this invention is to provide a new and improved method of pressing a first work piece from or through a second work piece which decreases the possibility of injury to the press operator and to damage to the pressed work piece.

SUMMARY OF THE INVENTION

Briefly stated, the invention in one form thereof, comprises a device for use with a press which may be of the type termed an arbor press which is the type first exemplified. An arbor press includes a base and a support in a generally C-shape including an upper head which carries a vertical ram for exerting a force on a first part to press the first part through or from a second part where the first part falls free when pressed through and separated from the second part. A vertically extending shaft is supported from the press or otherwise operatively positioned with respect to the press and an arm is mounted to the shaft for generally horizontal rotational movement on the shaft. A catch receptacle for a first part which is pressed free of a second part is received on the arm at a predetermined distance from the connection to the shaft. Means are provided for mounting the catch receptacle on the arm at varying distances from where the arm is mounted to the shaft whereby the catch receptacle may be positioned under the vertical ram of the press and catch a first part as it is pressed free of the second part. The shaft may be mounted to a bracket secured to the base or other part of a press and depend downwardly from the base of the press or the part it is attached to or the shaft may extend upwardly from a base resting on the floor.

The invention is particularly pointed out and distinctly claimed in the concluding portion of this specification. The invention, however, together with further objects and advantages thereof may be best appreciated by reference to the following detailed description taken in conjunction with the drawings.

DETAILED DESCRIPTION OF PREFERRED EMBODIMENTS OF THE INVENTION

Figures 1, 5:
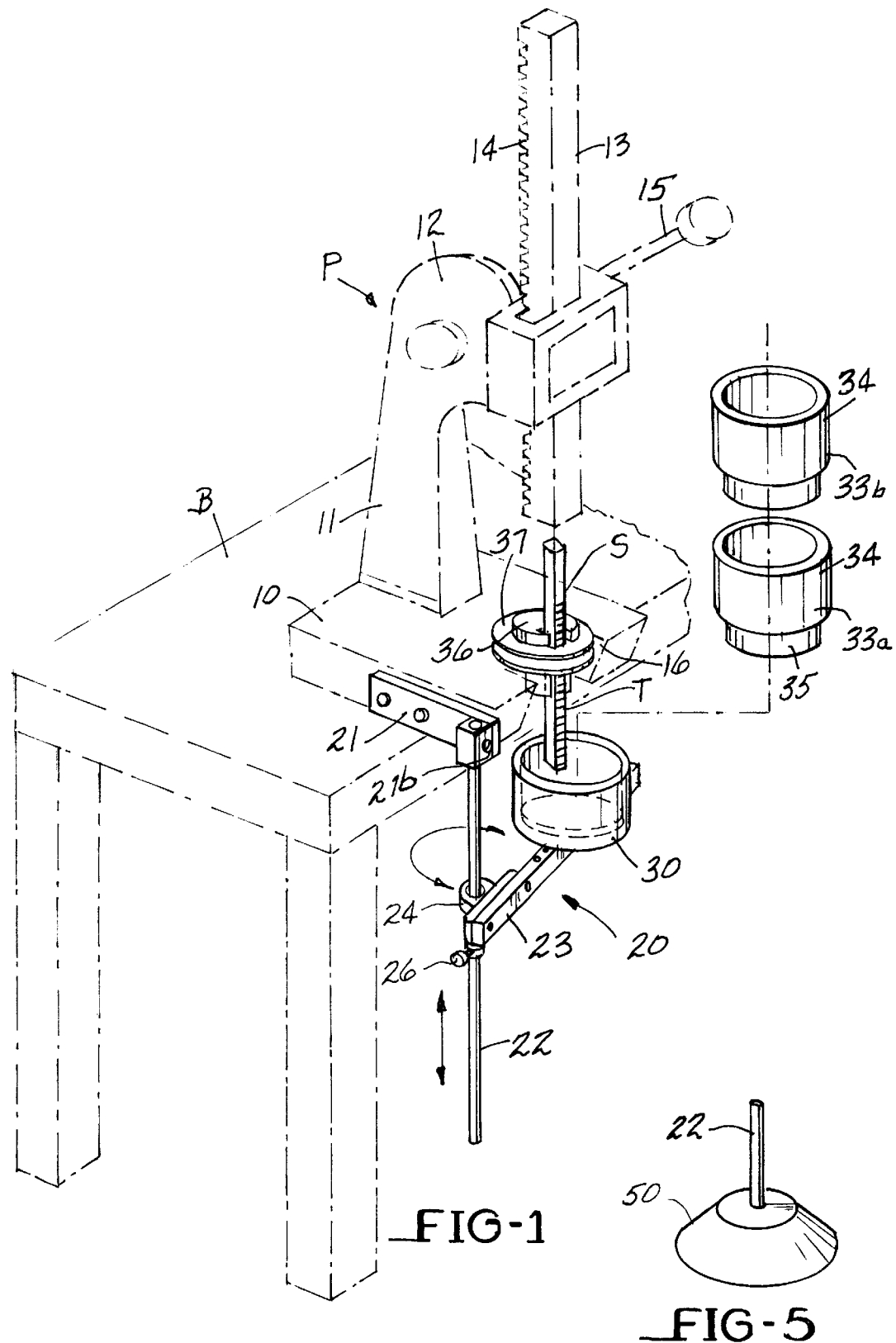
FIG. 1 is, a perspective view of a device embodying the invention mounted to the base of an arbor press which is shown in broken line.
FIG. 5 is a perspective view of a portion of a free standing device embodying the invention.

An arbor press P is shown in FIG. 1 on a bench B. Press P is of a well known type which comprises a frame having a base 10 with an up-right column 11 having a head 12. A ram 13 is vertically moveable in head 12. Ram 13 includes a rack 14 defined thereon which is driven by a pinion (not shown) rotated by a handle 15. The arbor press P is shown only for purposes of disclosure of the invention and need not further be described in detail since it is a conventional tool.

The base 10 of press P may have a cut out or receptacle 16, defined by legs of base 10 to receive a work piece or it may have a turret type work piece holder rotatably mounted to the base to receive various size work pieces.

Figure 2:
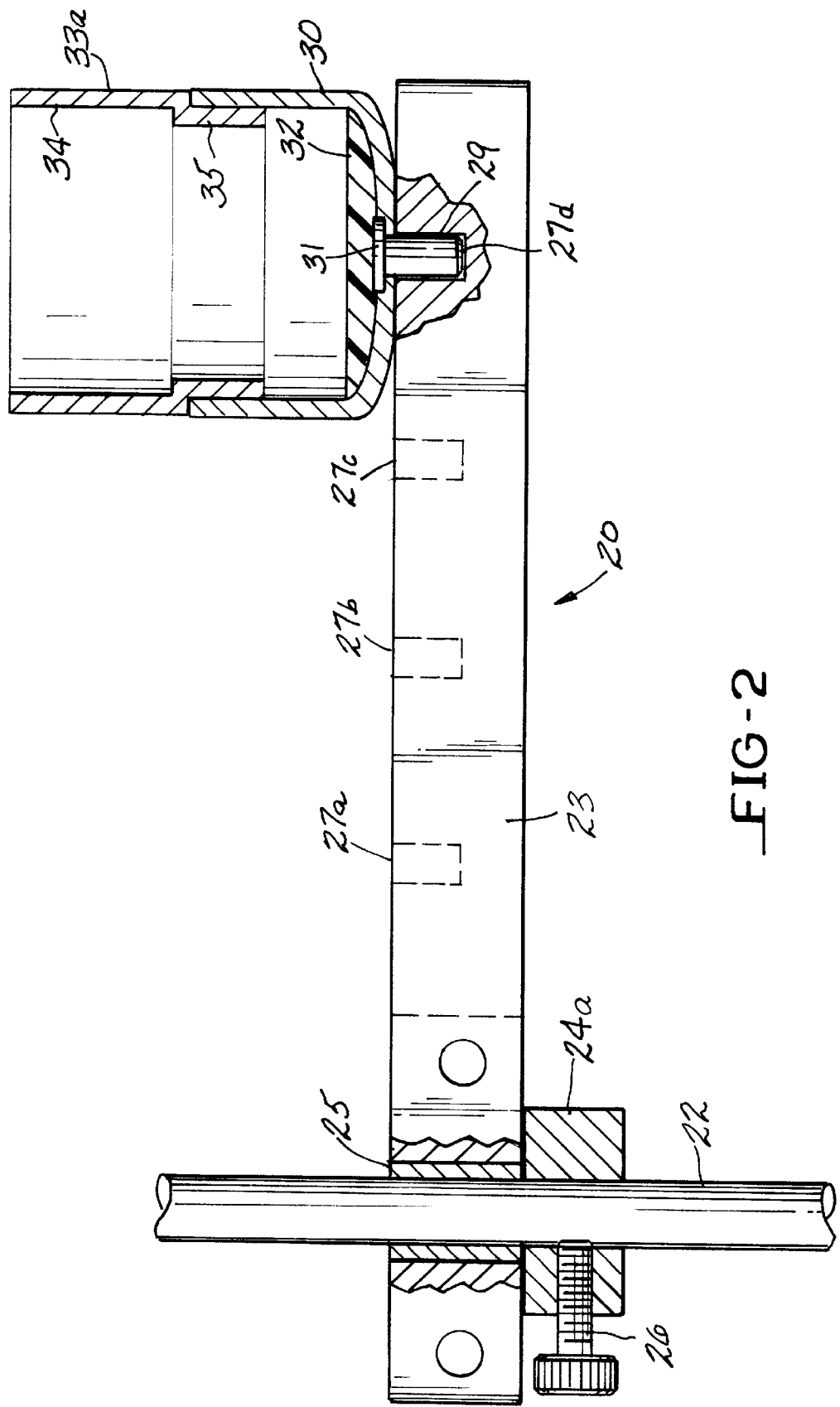
FIG. 2 is a view of a portion of the device of FIG. 1 seen in side elevation and partially cut away.

A work piece receptacle embodying the invention is identified by the reference numeral 20 and comprises a mounting member 21 secured to the base 10 of press P. Mounting member 21 includes a bearing or bushing 21a which receives a shaft 22 extending downwardly therefrom. Shaft 22 is located in vertical position and secured in mounting member 21 by a set screw 22a or other fastening device. A support arm 23 is rotatably mounted on shaft 22. Reference is also made to FIG. 2 taken in conjunction with FIG. 1. Arm 23 includes a bearing block or bushing 24 (FIG. 1) having a bearing 25 therein which slideably and rotatably receives shaft 22 therein. A separate collar 24a is slideably positioned on shaft 22 below arm 23 and threadably receives a set screw or bolt 26 which serves as a height setting for arm 23 on shaft 22. Collar 24a provides a support for arm 23. When set screw 26 is loosened, collar 24a may be vertically positioned on shaft 22 to set the height of arm 23 and then arm 23 is angularly adjusted to position a work piece receptacle as hereinafter described. If desired, bearing block 24 may be integral with arm 23, and also may be positioned at the end of arm 23.

Shaft 22 is made slideably adjustable in mounting member 21 to insure floor clearance depending on the height of the top of bench B and also permit broom clearance. Shaft 22 may move vertically through bushing 21a and is secured thereto by one or more set screws 21b.

Defined in arm 23 through the upper surface thereof are a plurality of sockets, 27a–27d, as shown. The sockets are arranged to receive a stud 29 extending from a receptacle 30 shown as a cup shaped member. Stud 29 is the cylindrical portion of a headed pin extending through the bottom of receptacle 30. An elastomeric pad 32 is positioned at the bottom of receptacle 30 to cushion a work piece which falls therein. The device as shown is arranged for use with a number of different arbor presses and may be supplied as original equipment by the press manufacturer.

As shown in FIG. 1, a plurality of receptacle depth extenders are provided and used dependent on the length of the work piece to be received. Two depth extenders 33a and 33b are shown. Each depth extender comprises a cylindrical portion 34 of the same diameter as receptacle 30 and a telescoping insert portion 35 of lesser diameter configured to be telescopically received in receptacle 30 or another depth extender.

Referring to FIG. 1, The press P is shown as acting on a first work piece, broach T, which is received in a passage in an adapter bushing 36 received in the bore of a second work piece, shown as a pulley 37. The broach T and press P are set-up to define a key way in pulley 37. The broach T is lubricated and then forced under pressure of ram 14 to cut a key way in pulley 37. The shank of broach T following the cutting teeth is of lesser dimension than the vertically tapered teeth and upon completing the cut, broach T will drop free of adapter bushing 36 and pulley 37 and fall freely if not caught. With the invention 20 used with press P, the broach T will fall into receptacle 30 and any depth extensions thereof mounted to receptacle 30. As previously mentioned, the press P may include a work holding device which may be in the form of a turret which defines various size work holders.

In operation, the device 30 is mounted to a press P, arm 23 is angularly adjusted to extend below where the first work piece, tool T, will drop and is vertically positioned in accordance with the length of the broaching tool or other first work piece to be pressed by setting the position of collar 24a. Alternatively, the arm may first be height positioned and then rotated to a position to catch the first work piece. The first work piece, upon being pressed free of the second work piece will fall into receptacle 30 and any depth extenders 33 thereon.

In the pressing operation, the second work piece, pulley 37, is paced on a support which as shown is the legs of base 10. The adapter bushing 36 is then located in the bore of pulley 37 and broach T is placed in the guide way therein and located below ram 13. Then the press is operated to cause the ram to press broach 37 through adapter bushing 36 and cut a key way or passage in pulley 37.

Figure 3:
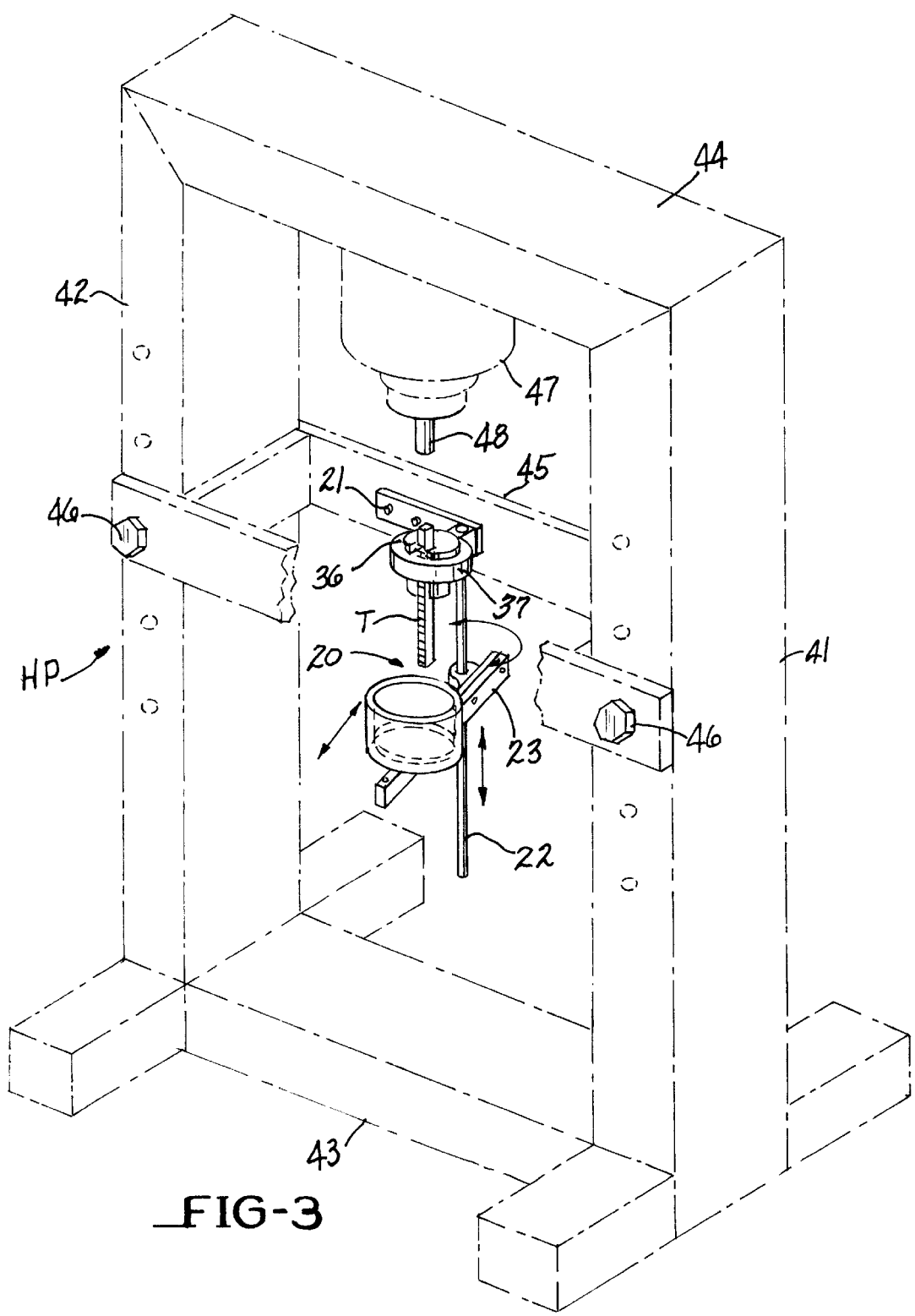
FIG. 3 is a view in perspective of an H-frame type hydraulic press, shown in broken line, with a device embodying the invention mounted thereto.

A device embodying the invention may be used with various type presses. Reference is now made to FIG. 3 which illustrates the invention in use on an H-frame hydraulic press HP. Press HP is shown in broken line in simplified form and generally comprises two spaced apart upright columns 41 and 42 connected by a bottom base member 43 and a top frame member 44 to provide a rigid construction. A cross member 45, generally referred to as a bed, is adjustably height positioned and secured by means of a plurality of pins or dowels 46 to columns 41 and 42. A hydraulic cylinder 47 includes a pressing ram 48 and is carried on top frame member 44. The upper surfaces of bed 45 provide support for a work piece or a fixture that may support a work piece. Such H-frame hydraulic presses are manufactured by Dake Division of JSJ Corporation of Grand Rapids, Mich. in a variety of designs and pressing capacities. The same company manufactures a number of different size and style arbor presses.

In this application, a device embodying the invention 20 may be mounted to an inside wall of cross member 45. In FIG. 3, the device 20 is identified by the same reference numerals as in the FIGS. 1 and 2 and the description thereof is the same. In FIG. 3 the work piece to be pressed is not shown as a pulley, but is representative of any object to have a key way cut therein by a broaching tool. The device 20 may also be mounted to the outside wall of a cross member 45.

Figure 4:
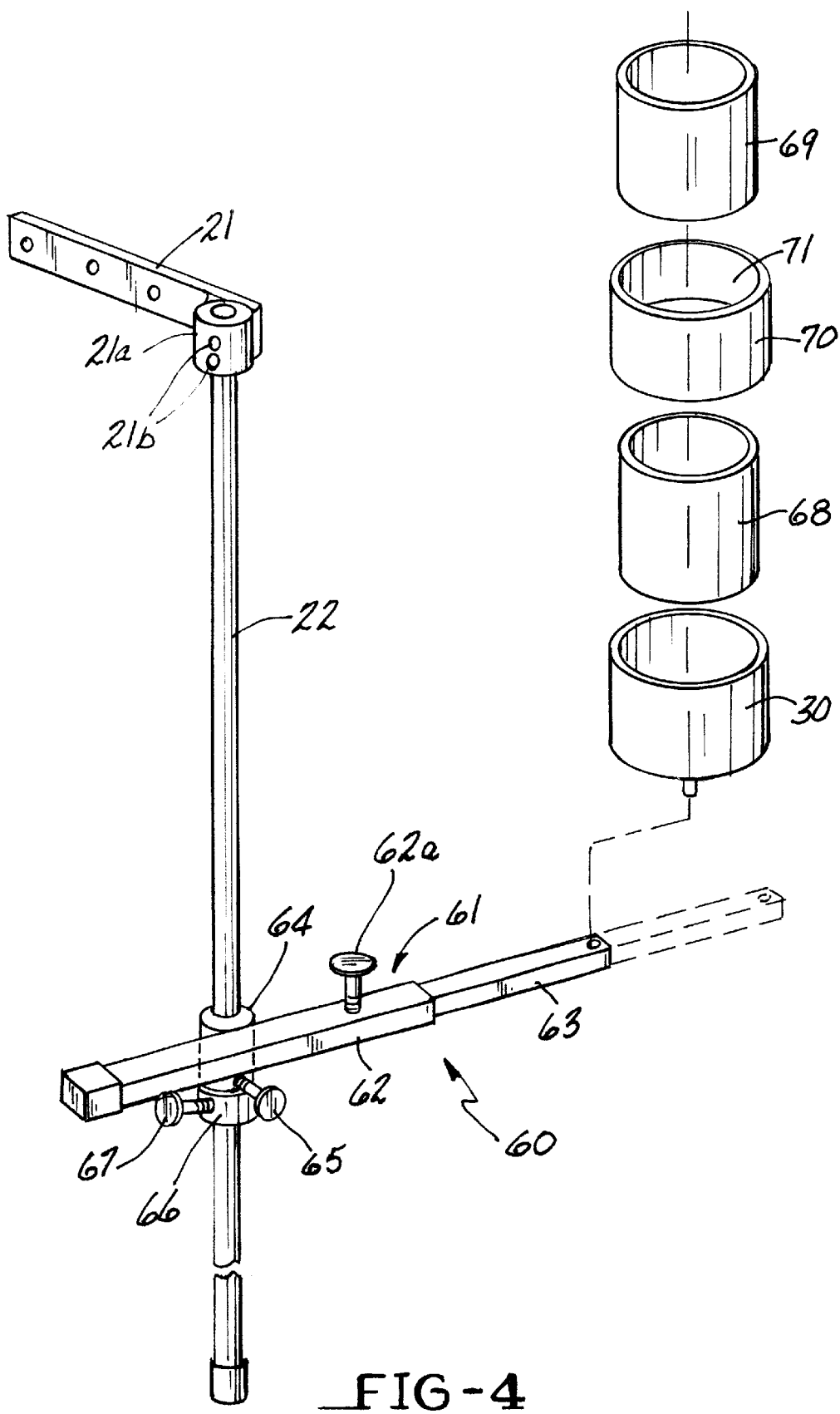
FIG. 4 is a perspective view similar to FIG. 1 of another embodiment of the invention.

Another embodiment of a device 60 embodying the invention is shown in perspective in FIG. 4. In FIG. 4 the same reference numerals are used to identify similar parts as in FIGS. 1 and 2. In FIG. 4, a support arm 61, which is telescopically adjustable in length comprises a support portion 62 shown as a box section element which slideably receives therein an extension portion 63. Extension portion 62 has a socket 64 defined in the upper surface thereof to receive a pin (not shown in FIG. 4) of receptacle cup 30 as shown in FIG. 2.

A bearing block 64 is carried on mounting portion 62 or is made integral therewith. Bearing block 64 slideably receives shaft 22 therethrough and also receives a locking screw 65 to lock mounting portion 62 in a selected angular position. A support collar 66 is provided on shaft 22. Collar 66 has a locking screw 67, shown as a thumb screw therein to set the height of arm 61 on shaft 22 and hence the height of arm 61 with respect to the length of the work piece to be pressed. The support collar 24*a* is provided separately so that screw 65 may be loosened and arm 61 may be rotated at a given height without being concerned about support when screw 65 is loosened for angular adjustment of arm 61.

Arm 61 is length adjusted by loosening screw 62*a* and sliding extending portion 63 of arm 61 with respect to mounting portion 62 as indicated in broken line in FIG. 4. In FIG. 4, the catch receptacle extenders are shown in a different and more economical form. The extenders, as shown, comprise two sections of PVC pipe 68 an 69 and a coupling 70 which has an internal shoulder 71. With this arrangement the depth of the catch receptacle may be varied to a number of depths. Pipes 68 and 69, which telescopically fit into cup 30, may be provided in many lengths in order to provide a multiplicity of catch receptacle depths. While not shown in FIG. 5, an elastomeric pad 32, as shown in FIG. 2, is provided in cup 30.

The invention may be used in conjunction with many different types of presses such as a press known as a C-frame press which is configured similar to the arbor press of FIG. 1, but has a hydraulically operated ram. Also, an A-frame press which is similar in construction to an H-frame press, but with a modified upper construction that is A-shaped.

The invention may also be constructed to be free standing. Reference is made to FIG. 5 which shows the shaft 22 extending from a base 50 which rests on the floor. The arm 23 (not shown in FIG. 4) is mounted on shaft 22 for both rotating and sliding movement as previously described.

The invention may be utilized to good advantage in any operation where a first work pieces is pressed through or from a second work piece. One other such operation is where a first shaft is pressed from a bearing or other object on the shaft. In such operation, when the ram of the press pushes an end of the first shaft into the bore of the second work piece, the ram is retracted and a second smaller diameter shaft is positioned between the ram and the first shaft. Then, the pressing operation is continued until the first shaft is pressed free of the second work piece.

The receptacle is made sufficiently deep by use of extenders on the cup that a pressed work piece will be retained rather than falling over and striking the floor.

Periodically the arms 23 or 61 may be rotated to a position where receptacle 30 and any extensions thereon may be easily removed from the arm and emptied of accumulated debris such as cutting chips and any oil wiped out or otherwise removed. Arm 23 is then rotated back to an operative position and height adjusted as necessary for the next operation. The receptacle may be extended by use of other devices than the extenders shown. A device embodying the invention, when the press is not in use, may be used to store a brush for cutting lubricant and dependent upon size, the container for the cutting lubricant, or any other items.

It may thus be seen that the objects of the invention set forth above as well as those made apparent are efficiently attained. While preferred embodiments of the invention have been set forth for purposes of disclosure, modifications to the disclosed embodiments as well as other embodiments of the invention may occur to those skilled in the art. Accordingly, the appended claims are intended to cover all modifications to the disclosed embodiments of the invention as well as other embodiments thereof which do not depart from the spirit and scope of the invention.

What is claimed is:

1. A device for use with a press of the type which includes a vertical ram for exerting a force on a first part to press the first part through a second part where the first part falls free when pressed through and separated from the second part, said device comprising a vertically extending shaft, an arm mounted to said shaft for generally horizontal rotational movement on said arm and height adjustment on said arm, a catch receptacle for a first part which is pressed free of a second part, means for mounting said catch receptacle on said arm at varying distances from where said arm is mounted to said shaft whereby said catch receptacle may be positioned under the vertical ram of the press and catch a first part as it is pressed free of the second part.

2. The device of claim 1 where said shaft is free standing.

3. The device of claim 1 wherein said shaft is mounted to a bracket secured to the press.

4. The device of claim 3 wherein the press is an arbor press having a base and said shaft is mounted to a bracket secured to said base.

5. The device of claim 1 wherein said catch receptacle is a cup shaped member of a first diameter and further includes one or more height extenders having cylindrical portions of said first diameter and a second diameter, said portions of said second diameter being sized to be telescopically received in said portions of said first diameter whereby one or more of said extenders may be stacked on said cup shaped member to extend the depth of said catch receptacle.

6. The device of claim 1 wherein said catch receptacle includes a cup shaped member and receives an elastomeric pad therein to cushion a falling first part.

7. The device of claim 1 wherein said catch receptacle is a cup shaped member and further includes a length of pipe telescopically received therein to extend the depth of the catch receptacle.

8. The device of claim 1 wherein said arm has an upper surface and a plurality of sockets are defined in said arm along the length thereof through said upper surface and said catch receptacle has a pin extending from the bottom thereof adapted to be received in one of said sockets whereby said catch receptacle may be positioned on said arm at varying distances from said arm mounting on said shaft.

9. The device of claim 1 further including cooperating means on said catch receptacle and said arm for, removably mounting said receptacle on said arm below said ram.

10. The device of claim 1 wherein said arm is adjustable in length.

11. The device of claim 10 wherein said arm comprises a mounting portion rotatably mounted to said shaft and an extensible portion slidable on said mounting portion to vary the length of said arm.

12. The device of claim 11 wherein said extensible portion is telescopically received in said mounting portion and is slideable therein.

13. In combination with a press which includes a frame and a vertically movable ram for exerting a force on a first part to press the first part through a second part where the first part falls free when pressed through and separated from the second part comprising, a vertically extending shaft positioned in proximity to the axis of said ram, an arm mounted to said shaft for generally horizontal rotational movement on said arm and height adjustment on said arm, a catch receptacle for a first part which is pressed free of a second part by said ram, means for removably mounting said catch receptacle on said arm at a predetermined distance from where said arm is mounted to said shaft whereby said catch receptacle may be positioned under said ram of said press and catch a first part as it is pressed free of the second part.

14. The combination of claim 13 wherein said shaft is free standing.

15. The combination of claim 13 wherein said shaft is mounted to a bracket secured to the frame of said press.

16. The combination of claim 13 wherein the press is an arbor press having a base and said shaft is mounted to a bracket secured to said base.

17. The combination of claim 13 wherein said catch receptacle is a cup shaped member of a first diameter and further includes one or more height extenders having cylindrical portions of said first diameter and a second diameter, said portions of said second diameter being sized to be telescopically received in said portions of said first diameter whereby one or more of said extenders may be stacked on said cup shaped member to extend the depth of said catch receptacle.

18. The device of claim 13 wherein said catch receptacle includes a cup shaped member and receives an elastomeric pad therein to cushion a falling first part.

19. The device of claim 13 wherein said catch receptacle is a cup shaped member and further includes a length of pipe telescopically received therein to extend the depth of the catch receptacle.

20. The combination of claim 13 wherein said arm has an upper surface and a plurality of sockets are defined in said arm along the length thereof through said upper surface and said catch receptacle has a pin extending from the bottom thereof adapted to be received in one of said sockets whereby said catch ail receptacle may be positioned on said arm at varying distances from said arm mounting on said shaft.

21. The device of claim 13 further including cooperating means on said catch receptacle and said arm for removably mounting said receptacle on said arm below said ram.

22. The combination of claim 13 further including cooperating means on said catch receptacle and said arm for removably mounting said receptacle on said arm below said ram.

23. The combination of claim 13 wherein said arm is adjustable in length.

24. The combination of claim 23 wherein said arm comprises a mounting portion rotatably mounted to said shaft and an extensible portion slideable on said mounting portion to vary the length of said arm.

25. The combination of claim 24 wherein said extensible portion is telescopically received in said mounting portion and is slideable therein.

26. The device of claim 13 wherein said catch receptacle includes a cup shaped member and receives an elastomeric pad therein to cushion a falling first part.

27. A method of pressing a first work piece through or from a second work piece using a press having a ram to press the first work piece, comprising the steps of positioning said work pieces on a support with said first work piece beneath said ram; providing a vertically extending support shaft in proximity to said ram having a horizontal arm thereon which is rotationally and height adjustable on said vertically extending support shaft, providing a first work piece catch receptacle on said horizontal arm so that said first workpiece catch receptacle is below said ram of said press and spaced a distance from first workpiece so as to permit the first work piece to fall into said first work piece catch receptacle when it is pressed through or from the second work piece; and operating said press to cause said ram to press the first work piece through or from the second work piece.

28. The method of claim 27 wherein said first work piece is a broach arranged to cut a passage through at least a portion of the second work piece and providing a guide bushing for locating said broach with respect to the second work piece.

29. The method of claim 27 including the further step of extending the depth of said catch receptacle in accordance with the length of the first work piece so that the first work piece will be retained in said catch receptacle.

* * * * *